May 29, 1934.    G. R. ANDERSON    1,960,614
TESTING APPARATUS FOR ELECTRICAL MACHINES
Filed Sept. 10, 1931    3 Sheets-Sheet 1
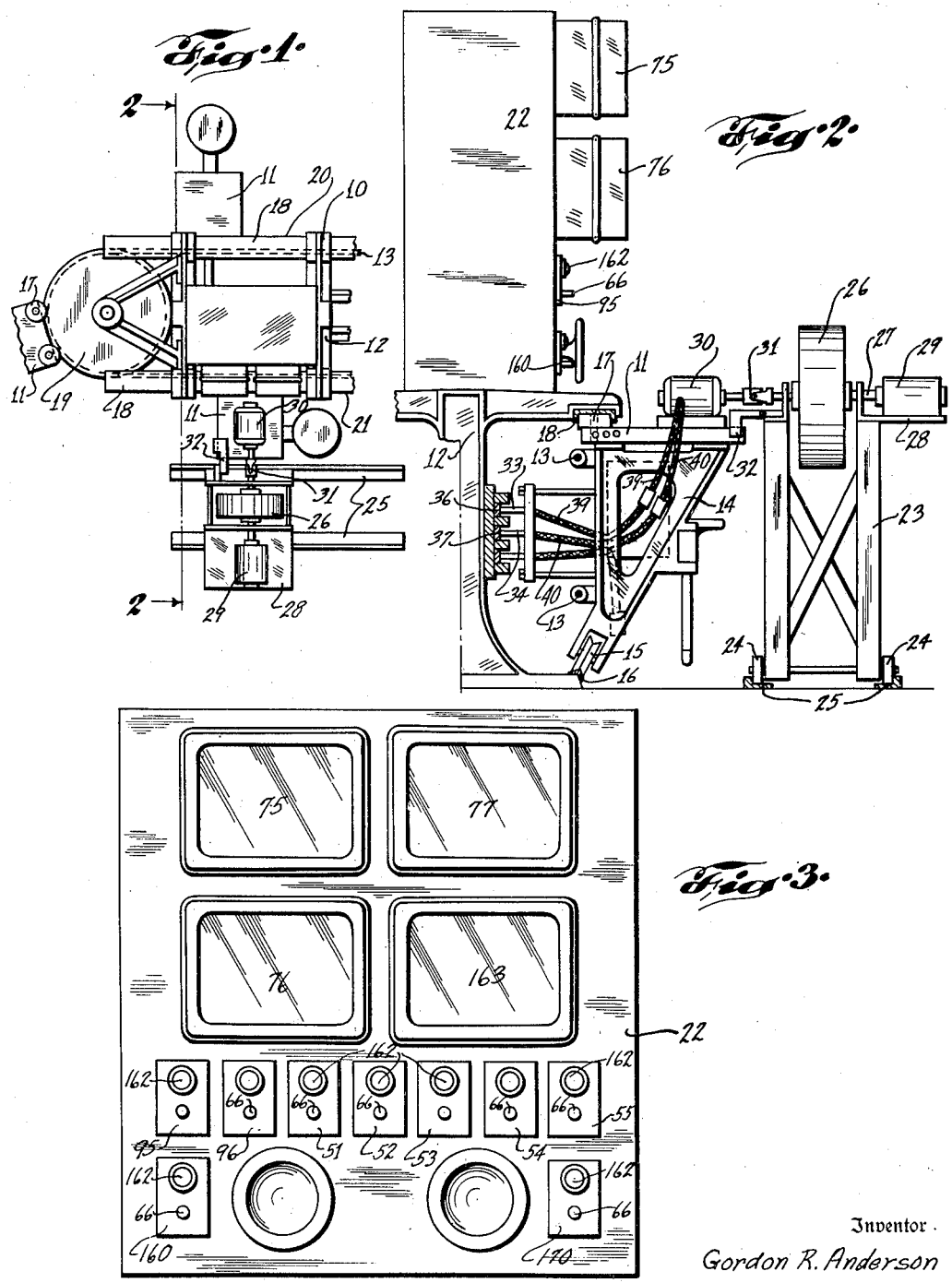

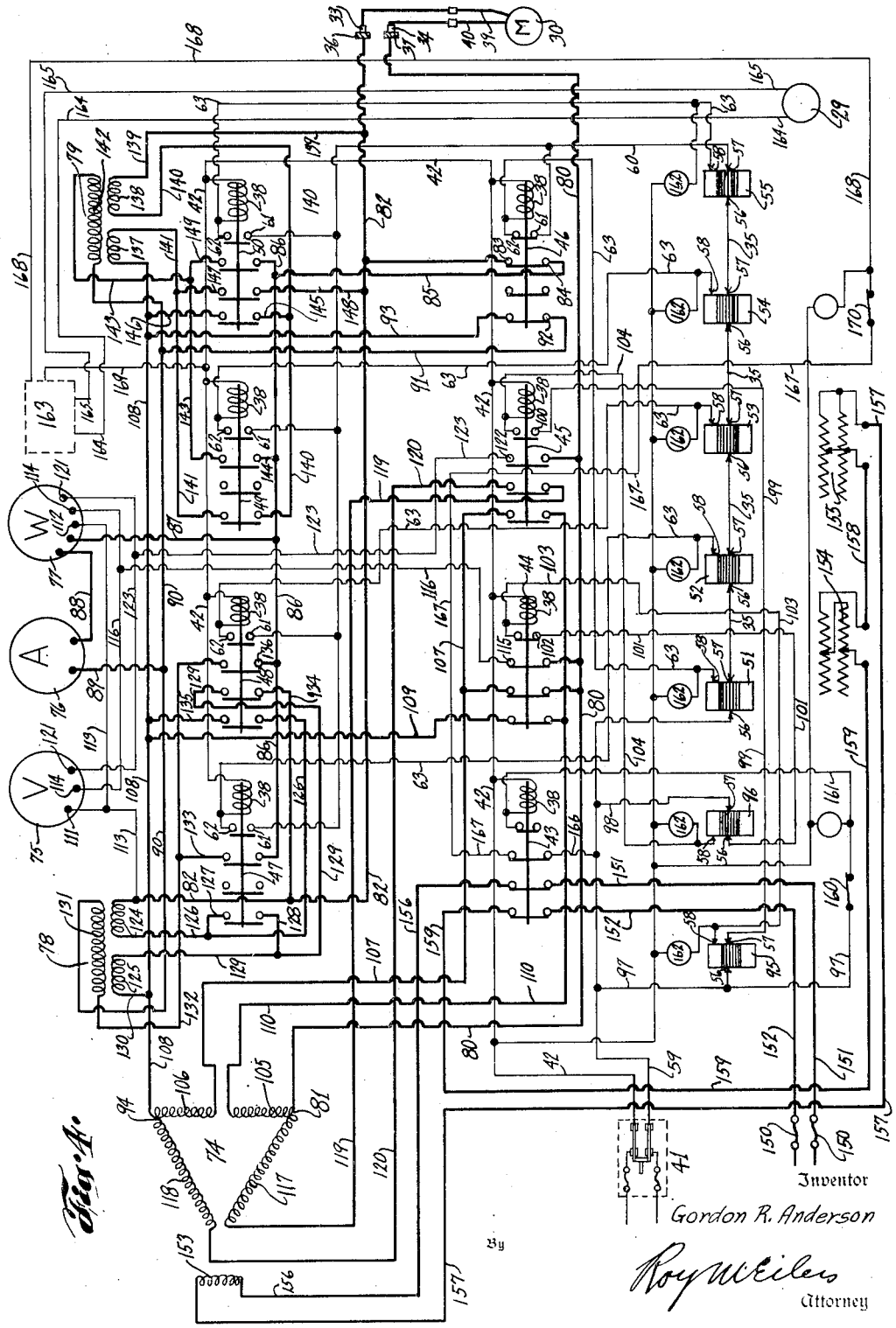

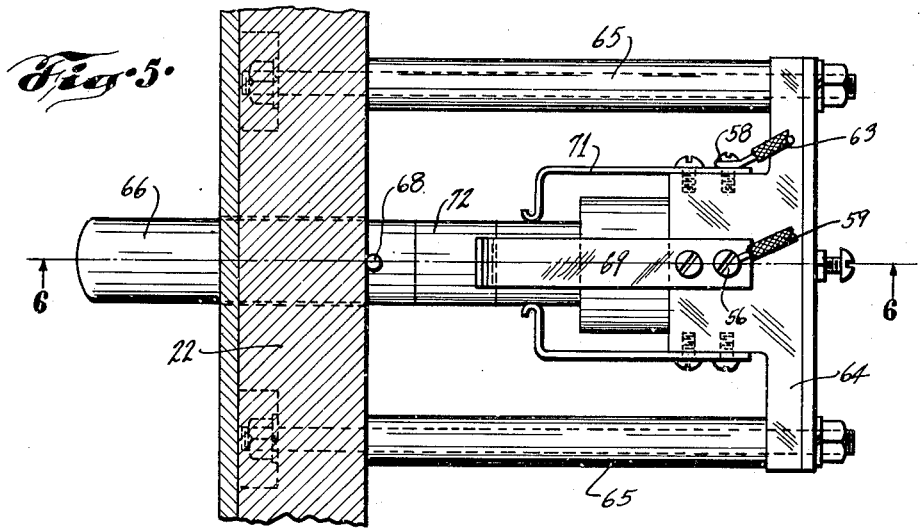
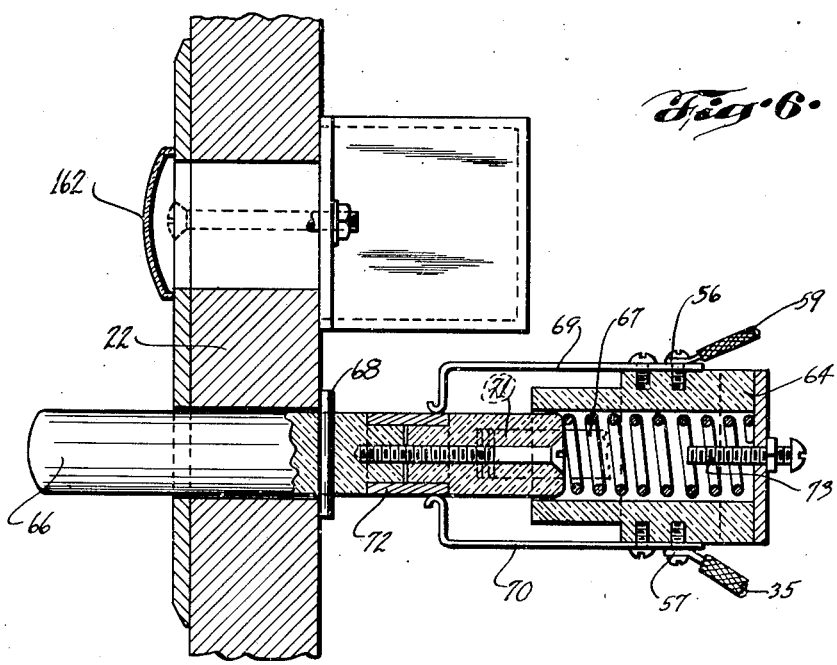

Patented May 29, 1934

1,960,614

UNITED STATES PATENT OFFICE 1,960,614

TESTING APPARATUS FOR ELECTRICAL MACHINES

Gordon R. Anderson, Beloit, Wis., assignor to Fairbanks, Morse & Co., Chicago, Ill., a corporation of Illinois Application September 10, 1931, Serial No. 562,129

16 Claims. (Cl. 175—183)

This invention relates to improvements in testing apparatus for electrical machines, and more particularly to improved means and methods for testing single phase motors and the like.

An object of the present invention is to provide an improved testing apparatus for electric motors, the test apparatus being arranged in adjacence to a continuous moving motor conveyor line, means for electrically connecting the motor under test to the testing apparatus, and meters adapted to be arranged in circuit relation with the testing apparatus for simultaneously recording the voltage, current, power and speed of the motor under test during its period of acceleration under a constant load.

A further object is to provide an improved motor testing device including meters in circuit relation with the motor under test, transformers of variable ratio, and means for rapidly varying the ratio of the transformers and for connecting the meters and transformers into circuit relation to facilitate the testing, in sequence, of motors of different sizes.

A still further object is to provide an improved motor testing apparatus including recording meters adapted to be arranged in various circuit relations with the motor under test, transformers of variable ratio, and means for connecting a predetermined transformer ratio in circuit relation with the meters and for disconnecting all other previously associated transformer ratios.

An additional object is to provide an improved testing apparatus for electrical motors which includes meters for indicating the voltage and power of a motor under test, and means for varying the voltage to the meters and motor.

Further objects and advantages will appear from the following detailed description of parts and the accompanying drawings, in which:

Fig. 1 is a fragmentary plan view of a preferred form of motor conveyor line; Fig. 2 is a sectional elevation taken along the line 2—2 in Fig. 1; Fig. 3 is a front elevation of a preferred form of instrument board employed in connection with the test appartaus; Fig. 4 is a diagram of a preferred electric circuit arrangement employed in connection with the instrument board shown in Fig. 3; Fig. 5 is a plan view, partially in section, of a preferred form of control switch employed in connection with the circuit arrangement shown in Fig. 4, and Fig. 6 is a section taken along the line 6—6 in Fig. 5.

Referring by numerals to the drawings, 10 designates, generally, a portion of a continuous moving motor conveyor and testing line, which includes a plurality of individually spaced conveyor plates 11 which are moved along and around a stationary table 12 by means of a pair of conveyor cables 13, which are securely attached to each plate structure. Each plate is, by preference, securely attached to its individual frame structure 14, which is provided with a grooved roller 15 which engages a guide member 16 securely fastened to the table 12. A pair of rollers 17 carried by the frame 14 engage a channeled guide member 18 which is securely attached to the table 12. A plurality of driving sheaves or cogwheels 19 (one of which is shown in Fig. 1) are suitably journaled at opposite ends of the table, the sheaves serving to guide and propel the cables 13. By this arrangement the individual conveyor plates are positively guided during their movement along the sides of the table 12. The motor assembling is started on each conveyor plate 11 on side 20 of the table 12, and as the individual conveyor plates are progressively moved around the table, the various motor parts are assembled thereto, in sequence, until the completed motor reaches side 21 of the table, at which time the completely assembled motor is ready for test. The above described arrangement of motor assembling line is described and claimed in detail in a copending application of William C. Heath, filed November 23, 1931, and bearing Serial No. 576,848.

The improved apparatus for testing the completely assembled motor during the time it is being conveyed past the testing apparatus will now be described. A testing panelboard indicated generally, at 22, is supported, by preference, upon and near one end of the table 12. A movable stand 23 is, by preference, mounted upon rollers 24 which are arranged to travel along a short length of track 25 which is disposed parallel to and spaced from the test board 22. A flywheel 26 is keyed to a shaft 27 which is rotatably supported in ball bearing journals on the stand 23. A bracket member 28 is fixedly attached to the upper end of the stand, and serves to support a tachometer 29, which is operatively connected to the shaft 27. An assembled motor 30 is supported upon suitable insulating pads which are temporarily mounted on the plate 11. When the motor 30 is conveyed to a point near the right end of the panelboard 22 (Fig. 1) the shaft of the motor is operatively connected to the shaft 27 of the disc 26, by means of a short flexible coupling 31. At the same time, a pivoted dog or driver 32 which is hingedly secured to the stand 23, is swung downwardly into engagement with an edge portion of the plate 11 so that this plate and stand 23 move along together under the influence of the continually moving conveyor line. A plurality of flexible contacting fingers 33 and 34 are carried by the frame structure 14, the fingers being arranged slidably to engage, respectively, a plurality of bus bars 36 and 37 which are fixedly attached to the table 12. It will, of course, be understood that in testing single phase motors, only a pair of the fingers and bus bars are utilized, the fingers being connected to leads 39 and 40 which are provided, respectively, with suitable terminal clips for connection to the motor leads. A third bus bar and contacting finger is shown in Fig. 2, merely to illustrate a possible modification of the present assembly for three-phase motor testing.

In the present example the bus bars 36 and 37 are, by preference, electrically connected through a plurality of test circuits to a suitable source of power and, therefore, when the flexible fingers 33 and 34 engage these bars, the motor is energized and begins to accelerate the load or flywheel 26. By suitable electric connections associated with the test board 22, as will be hereinafter described, the current, voltage, power and speed of the motor under test is indicated or recorded, simultaneously, on continuous recording charts associated with the instrument board. It will, of course, be understood that during the period of acceleration the accelerating torque of the motor is used up entirely (minus a negligible amount of friction) in bringing the flywheel 26 up to speed. The details of the electric circuit panelboard arrangement employed in connection with the motor testing apparatus is illustrated in Fig. 4 of the drawings. By the above provision motors are continuously being conveyed past the testing apparatus, and therefore the space relation between adjacent motor conveyor plates 11 is dependent upon the time period for testing a particular motor, and upon the linear speed of the conveyor line. The arrangement is such that when one motor has passed the testing apparatus, the adjacent conveyor plate has brought a second motor into testing position. Obviously, means are provided for testing a traveling motor and for loading the motor by the work of acceleration of a traveling flywheel. The testing apparatus includes a plurality of testing circuits which are selectively arranged in circuit relation with a motor under test to facilitate the testing, in succession, of motors of several different sizes without interrupting the travel of the conveyor line. By a novel arrangement of manual control mechanism, there is provided means for automatically changing the current transformer ratio upon the recording ammeter and current side of the wattmeter to correspond to the rated current capacity of the motor under test, so as to facilitate the use of a single recording ammeter and wattmeter for purposes of testing motors of different sizes upon the same conveyor line. The novel arrangement of switching control mechanism will first be described in connection with the circuit diagram shown in Fig. 4.

Referring now to Fig. 4 which illustrates diagrammatically a preferred arrangement of control and test circuits, the auxiliary or control circuit being shown in relatively light lines, and the main test circuit being shown in heavy lines. The auxiliary control circuit effects the opening and closing of a plurality of multi-contact magnetic relays for obtaining main circuit set-ups with the source of power and the motor under test, and for establishing the correct current transformer hook-up to the recording instruments.

Power is supplied to the auxiliary circuit by means of a separate alternating current source which is electrically connected to a fuse-switch 41. A lead 42 is electrically connected to the switch 41 and to one side, respectively, of a plurality of coils 38. These coils serve to actuate, respectively, a plurality of multi-contact magnetic relays 43, 44, 45, 46, 47, 48, 49 and 50. Obviously, one coil 38 is associated with the armature end of the multi-contactor switching arm of each respective relay.

For purposes of individually and collectively controlling the actuating coils 38 of the relays, there is provided a plurality of manual control switches 51, 52, 53, 54 and 55. Each switch is provided with terminals 56, 57 and 58. A lead 59 is electrically connected to the switch 41 and to the terminal 56 on the switch 51. The terminals 57 of switches 51, 52, 53 and 54 and the terminals 56 of switches 52, 53, 54 and 55 are interconnected in series relation by means of conductors 35. A lead 60 is connected to the terminal 57 of the switch 55. Each multi-contactor 46, 47, 48, 49 and 50 is provided with a terminal 61 which is connected to the lead 60 by means of separate branch leads. A contact terminal 62 on each of the relays 46, 47, 48, 49 and 50 is connected by means of a branch conductor to the associated relay actuating coil 38. Obviously, when a relay is actuated to closed position the contact terminals 61 and 62 of the associated relay are interconnected. The contact terminals 62 of relay 46, 47, 48, 49 and 50 and the terminals 58 of switches 51, 52, 53, 54 and 55 are interconnected, respectively, by means of branch conductors 63.

For clearness in description and understanding of the operation of the control circuit above described, it will be necessary to describe the constructional details and operation of the manual control switches 51, 52, 53, 54 and 55. It will, of course, be understood that each of these control switches are identical in construction so that a detailed description of the construction of switch 51 will suffice. These switch assemblies are supported on the panelboard 22. An insulated supporting bracket 64 is fixedly secured in spaced relation on the rear side of the panelboard by means of spacer members 65. A pushbutton 66 extends through the outer side of the panelboard so as to be readily manipulated therefrom. This push-button is normally urged to its extreme outward position by means of a spring 67 which is carried and partially enclosed by the supporting bracket 64, the rear portion of the bracket forming an abutment for one end of the spring. The outward movement of the push-button 66 is limited by a stop pin 68 carried on the stem of the push-button, the pin being normally arranged to engage the rear side of the panelboard. The member 64 is provided with a plurality of spring contacts 69, 70 and 71 which are arranged to slidably engage a conductor ring member 72 which is fixedly secured to the push-button stem. These spring contacts are so arranged in relation to the ring member, that when the push-button is in its extreme outward position, only contacts 69 and 70 are in engagement with the ring. It will be readily understood that the spring contacts 69 and 70 are connected to leads 59 and 35, respectively, by means of the terminals 56 and 57. Therefore, when all the switches 51, 52, 53, 54 and 55 are in their normal position of operation the lines 59 and 60 are interconnected in series relation through these switches. But if none of the relays are in closed position, the contact terminals 61 and 62 on the relays will not be bridged, and the circuit to the power source through the coils is broken. It will, of course, be understood that when the coil which is associated with the relay is not energized, a suitable spring (not shown) will hold the relay in open position.

The above arrangement of switching means interconnects in series relation all the switches and the coils of each relay, so that when a particular relay has been actuated to closed position, the coil associated with the particular relay is maintained in an energized circuit. Now should anyone of the control switches, say switch 51, be manually actuated by pressing the associated push-button 66 inwardly against the pressure of the spring 67, until the inner end of the push-button stem engages an adjustable stop 73 carried by the bracket 64, the bridging relation between ring member 72 and the spring contacts 69 and 70 is broken. This disturbs the series relation between the source of power and the actuating coils, thereby de-energizing all the coils and causes all the relays to open. When the push-button is released, the spring 67 urges the push-button towards its outward position, but during a portion of this movement a momentary contact is established between spring contacts 69, 70 and 71 and the conductor ring 72. In this momentary position of the switch, the coil 38 of multi-contact relay 46 is energized from the separate power source, in the following manner. With switch 41 in closed position, power is fed through the lead 59 to the spring contact 69, ring member 72, spring contact 71 which is electrically connected to branch lead 63 by means of terminals 58, the lead 63 being connected to the coil 38 which is in turn connected to the source of power by means of the lead 42. Obviously, upon energization of this coil the multi-contactor 46 closes and the contacts 61 and 62 of the relay are interconnected. It will, of course, be understood that in this same momentary position of the switch, the ring member 72 of the push-button is in bridging relation with the spring contacts 69 and 70. Upon continued outward movement of the push-button, the connection between spring contact 71 and the ring member 72 is broken, but since the spring contacts 69 and 70 are maintained in bridging relation with the conductor ring 72, the circuit arrangement is from the source of power through the closed switch 41 to the lead 59, spring contact 69, ring 72, spring contact 70 and through the series arrangement with switches 52, 53, 54 and 55, to lead 60, contacts 61 and 62 and through the coil 38 and back to closed switch 41 over lead 42.

It will, of course, be understood that the above described movement of the switch 51 controls the opening of all the relays and the closing of the relay 46. Now with multi-contactor 46 closed, the actuation of any one of the other control switches 52, 53, 54 or 55 in like manner will cause, first, the opening of all the multi-contactors, and then the closing of the particular multi-contactor associated with the particular switch which has been actuated. By the above control arrangement, switching means are provided for selectively and collectively controlling the actuation of a plurality of relays. These relays are arranged in different testing circuit relation with the motor under test, the source of power for the motor, the recording instruments, and the transformers. Therefore, upon actuation of any one of the manual control switches 51, 52, 53, 54 or 55, a predetermined testing circuit arrangement is established through the associated multi-contact relay. Each multi-contactor 46, 47, 48, 49 and 50 is provided with a plurality of paired terminals which are adapted to be interconnected in pairs by the contactor arm of the relay. Power is supplied to the main test circuit from an alternator 74. The voltage, current, and power supplied to the motor under test is recorded upon suitable recording instruments, such as a voltmeter 75, ammeter 76 and wattmeter 77. Current transformers 78 and 79 are electrically connected into various circuit relations with the ammeter and current side of the wattmeter through the various multi-contactors. A conductor 80 is connected to a terminal 81 of the alternator and to the bus bar 37. This bus bar is electrically connected by means of the flexible fingers 34 to the motor under test. A conductor 82 is electrically connected to bus bar 36 which is connected by means of the flexible finger 33 to the motor under test. The conductor 82 is connected by means of a branch lead to a terminal 83 on the multi-contactor 46 and when the relay is closed the terminal 83 is interconnected to a terminal 84 on the relay 46. A branch lead 85 from the terminal 84 is connected into series relation with the current side of the wattmeter 77 and the ammeter 76 by means of leads 86, 87, 88 and 89. The lead 89 is connected to leads 90 and 91, the latter lead being connected to a contact terminal 92 on the relay 46 which when in closed position interconnects this terminal to a branch lead 93 which is directly connected to a terminal 94 on the alternator 74. Obviously, the above circuit relation is effective only when the relay 46 has been actuated to closed position by actuation of the manual control switch 51 which simultaneously actuates all the remaining relays to open position. It will be readily seen that neither of the current transformers are effective in this circuit, since they are not connected to the relay 46. In the present effective test circuit, the ammeter and current side of the wattmeter are connected directly in series with the alternator and the motor under test. This hook-up is employed for low capacity motors, the ammeter and the current side of the wattmeter being calibrated to record accurately the current values within this low current range.

The relays 44 and 45 provide means for altering the scale connections of the voltmeter 75 and the voltage side of the wattmeter 76 to correspond to the voltage impressed on the main test circuit. These same relays provide means for altering the winding connections of the alternator 74 for purposes of delivering 110 or 220 volts to the main test circuit. Switches 95 and 96 control the actuation of relays 44 and 45, respectively, these switches are connected into circuit relation with the auxiliary control circuit associated with switch 41. The construction of switches 95 and 96 is identical to that of the remaining control switches 51, 52, 53, 54 and 55, so that the numeral designations for the parts of switch 51 will apply equally to the description of the operation of switches 95 and 96. When the switch 41 is in closed position, the source of power is electrically connected to conductor 59 which is connected to the terminal 56 of the switch 95, and to the terminal 57 of the switch 96 by means of branch conductors 97 and 98 respectively. The terminal 57 of the switch 95 is connected by means of a branch lead 99 to a terminal 100 on the relay 45. This terminal is interconnected to the coil 38 of the relay 45 when this particular relay is in closed position. The terminal 56 of the switch 96 is connected by means of a branch lead 101 to a terminal 102 on the relay 44. This terminal is interconnected to the coil 38 of the relay 44 when this relay is in closed position. The terminals 58 on the switches 95 and 96 are interconnected in series relation with the coils 38 of the relays 44 and 45 by means of conductors 103, 42 and 104.

When push-button 66 associated with switch 95 is urged inwardly, the bridging relation between spring contact 69, ring 72 and spring contact 70 is broken, which interrupts the series relation between conductors 59 and 99 for a purpose hereinafter appearing. By releasing the push-button, the spring contacts 69 and 71 are momentarily interconnected, by means of the ring 72 thereby connecting the lines 59, 97, 103 and 42 in series relation with the coil 38 of the relay 44, thus actuating this relay to closed position. Upon continued outward movement of the push-button the bridging relation between spring contacts 69 and 71 is broken, but since, the coil 38 of relay 44 is maintained in series relation with the source of power by means of leads 59, 98, 101, contact terminal 102 on relay 44 and lead 42 this multi-contactor remains in closed position. Now if switch 96 is actuated, the previous energizing circuit for coil 38 of relay 44 is interrupted by disturbing the bridging relation between leads 98 and 101, thereby causing the multi-contactor 44 to open. Upon releasing the push-button 66 associated with the switch 96, a momentary bridging contact is provided between the lead 98, ring member 72 and lead 104. By this arrangement the coil 38 of relay 45 is interconnected in series relation with the source of power by means of leads 59, 98, 104 and 42, thereby causing the multi-contactor 45 to close. It will be readily seen that switching means are provided for controlling the relays 44 and 45. When relay 44 is actuated to closed position, armature windings 105 and 106 on the alternator 74 are arranged in parallel relation by means of leads 80, 107, 108, 109 and 110 which are interconnected through the relay. By this provision approximately 110 volts are being delivered by the alternator. The relay 44 when closed interconnects the 110 volt scale of voltmeter 75 and the voltage side of the wattmeter 77 across the main leads from the alternator. A tap 111 on the voltmeter 75 is directly connected to the main line lead 82 and to a tap 112 on the wattmeter by means of leads 113. Taps 114 for the 110 volt scale of the voltmeter and the wattmeter are connected to a terminal 115 on the multi-contactor 44 by means of a conductor 116. The terminal 115 is connected to the main power line 80 when the relay 44 is in closed position. It will be readily seen that when the relay 44 is actuated to closed position by controlling movement of switch 95, the alternator is connected to deliver 110 volts and the voltmeter and the wattmeter have their 110 volt scales effective. By this same control movement the relay 45 is actuated to open position.

By actuation of the control switch 96, the relay 44 is actuated to open position, and the relay 45 is actuated to closed position. Armature windings 105, 106, 117 and 118 of the alternator 74 are interconnected in series relation by means of conductors 107, 108, 119 and 120 which are connected to paired contact terminals on relay 45. By this provision, 220 volts is available across the terminals 81 and 94 of the alternator for delivery to the motor under test. The taps 110 and 112 of the voltmeter and wattmeter remain in circuit relation with the main line lead 82. Taps 121 on the voltmeter and wattmeter are connected to a terminal 122 on the relay 45 by means of a conductor 123. The terminal 122 is connected to the main line 80 when the relay is in closed position. It will be readily understood that switching means are provided for selectively associating in circuit relation the armature winding of the alternator and the voltmeter and wattmeter for purposes of changing the delivered voltage and effective scales of the instruments. It will be readily seen that the control switches for the voltage control relays are interconnected into the auxiliary control circuit for the current control relays but that each control circuit functions independently and separately.

The purpose of the multi-contactors 46, 47, 48, 49 and 50, when actuated individually, is to alter the main circuit connections between the current transformer and the ammeter and current side of the wattmeter, so as to step-down the current to a value measurable upon the single ammeter scale. When the multi-contactor 47 is actuated into closed position by actuation of the switch 52, the same control movement simultaneously opens all the remaining multi-contactors 46, 48, 49 and 50. Primary coils 124 and 125 of the transformer 78 are interconnected in series relation with the alternator 74 by means of leads 82, 126, 127, 128, 129, 130 and 108. The leads 127 and 128 are suitably connected to terminals on the multi-contact 47. The secondary coil 131 of the transformer 78 is connected into series relation with the ammeter 76 and the current side of the wattmeter 77 by means of leads 89, 90, 132, 133, 86, 87 and 88. The leads 86 and 133 are electrically connected to paired terminals on the multi-contactor 47. By this provision the current to the ammeter and the current side of the wattmeter is stepped down, so as to facilitate the use of the same instruments for testing motors of larger current capacity than is possible over the circuit arrangement described in connection with the multi-contactor 46. It will, of course, be understood that the voltmeter and voltage side of the wattmeter are connected into circuit relation through either the multi-contactor 44 or 45 depending upon the voltage rating of the motor under test.

When the multi-contactor 48 is actuated to closed position, by the control switch 53 (all other closed relays 46, 47, 49 and 50 being opened) the primary coils 124 and 125 of the current transformer 78 are interconnected in parallel relation by means of conductors 134, 126, 135, 108, 130 and 129. The leads 126, 129, 134 and 135 are electrically connected to paired terminals on the multi-contactor 48 which when in closed position completes the above circuit arrangement. The secondary coil 131 of the transformer 78 is connected in series relation with the ammeter 75 and the current side of the wattmeter by means of conductors 89, 90, 132, 136, 86, 87 and 88. The leads 132 and 136 are interconnected when the multi-contactor is in closed position to complete the circuit arrangement. By this provision a greater step-down ratio to the ammeter and current side of the wattmeter is obtained and, therefore, a motor of larger current capacity may be tested than is possible with the circuit arrangements described in the last two multi-contactors.

For purposes of testing motors of larger current rating, the transformer 79 is constructed, by preference, to give greater step-down ratios than that of the current transformer 78.

When multi-contactor 49 is actuated to closed position by control movement of switch 54 (relays 46, 47, 48 and 50 being opened) primary coils 137 and 138 of the current transformer 79 are connected in series relation with the main line lead by means of conductors 82, 139, 140, 141 and 108. The leads 140 and 141 are interconnected when the relay 49 is closed. Secondary coil 142 of the transformer 79 is connected in series relation with the ammeter 75 and the current side of the wattmeter by means of conductors 89, 90, 143, 144, 86, 87 and 88. The leads 143 and 144 are interconnected when the relay 49 is in closed position. Obviously, with this set-up a greater step-down ratio is available than with any of the previous multi-contactor hook-ups. When multi-contactor 50 is actuated to closed position by means of switch 55 (relay 46, 47, 48 and 49 being opened) the primary coils 137 and 138 of the transformer 79 are connected in parallel relation between the leads 82 and 108 by means of conductors 139, 140, 145, 146, 141, 147 and 148. The leads 145, 146, 147 and 148 are interconnected in pairs when the relay is in closed position. The secondary coil 142 of the transformer 79 is connected in series relation with the ammeter and the current side of the wattmeter by means of leads 89, 90, 143, 149, 86, 87 and 88. The leads 86 and 149 are interconnected when the relay 50 is in closed position. By this arrangement a higher current transformer ratio is obtained than is possible over any other of the test circuit hook-ups. It will, of course, be understood that in the present example only five current varying switches are shown, and that more or less switches may be employed without departing from the underlying principles of the invention.

The present improved testing board arrangement facilitates the testing of a variety of sizes of motors upon the same meters. When a particular size of motor is to be tested, the current capacity of the motor determines the proper transformer ratio to be connected into the ammeter circuit, and this is accomplished by actuating the particular control switch to establish the proper electrical hook-up through the transformer changing multi-contactor. The voltage rating of the motor determines the particular voltage changing switch to be actuated.

The alternator field is excited from a source of direct current which is connected through the fuses 150 to leads 151 and 152. Alternator field winding 153 and variable field rheostats 154 and 155 are connected in series relation with the source of excitation by means of conductors 151, 156, 157, 158, 159 and 152. Conductors 151, 156, 152 and 159 are interconnected in pairs when the relay 43 is in closed position. The relay 43 is controlled by the actuation of a control switch 160 which is connected in series with the actuating coil 38 of the relay by means of conductors 59, 97, 161 and 42. Obviously, when the switch is actuated to closed position, the coil 38 is connected in series with the source of alternating current through switch 41. It will, of course, be understood that suitable switch position-indicating lights 162 are connected into circuit relation with each particular switch.

The tachometer 29 mounted on the moving support 23 is electrically connected to a speed recording instrument 163 on the panelboard 22 by means of conductors 164 and 165. The recording instrument 163 is connected in series relation with the auxiliary control circuit by means of conductors 59, 166, 167, 168, 169 and 42. The leads 166 and 167 are interconnected when the relay 43 is in closed position. A control switch 170 is connected between the leads 167 and 168. It will be apparent that the instrument 163 is only operative when the control switch 170 and the multi-contactor 43 are both in closed position.

By the above improved arrangement of motor testing apparatus, there is provided switching control means for selectively associating any desired current transformer ratio in circuit relation with the recording ammeter, and for clearing all previously connected current transformer ratios from the panelboard. This feature of changing transformer ratios is attained by a single movement, the pushing of the button associated with the particular ratio desired. By this provision a single recording ammeter may be employed to record accurately the motor characteristics of a variety of sizes of motors. It will be readily understood that the present testing apparatus provides means for selectively associating a motor under test, with a plurality of testing circuits for simultaneously recording all the necessary data for determining the motor characteristics in commercial testing. Switching means are provided for controlling the alternator field excitation, testing circuit arrangement between the variable ratio current transformers and meters, and the voltage of the alternator, these switching control means being interconnected into the auxiliary control circuit. Switches 51, 52, 53, 54 and 55 control selectively the actuation of the relays 46, 47, 48, 49 and 50 to effect various test circuit relations between the transformers of variable ratios and the ammeter and wattmeter. The switches 95 and 96 control selectively the actuation of relays 44 and 45 to effect various alternator armature winding changes for varying the voltage delivered and for interconnecting the corresponding scale of the voltmeter and wattmeter into the various test circuit relations. It will, of course, be understood that the control switching means for changing the alternator voltage eliminates the possibility of short-circuiting the alternator armature winding.

Obviously, for commercial tests, comparative values are satisfactory so that maximum and minimum limits of the speed time chart may be set up for a given voltage chart and motors that meet specifications will produce charts having a curve falling between the desired limits. In the case of the repulsion induction single phase motor, the torque is measured for both repulsion and induction operation, the speed of action of the short circuiter is accurately obtained as indicated by the point of increase of current and watts and full data relative to starting and acceleration characteristics is obtained. The ammeter, voltmeter, wattmeter and speed indicating instrument are each provided, by preference, with paper charts which operate at a constant and definite speed. These charts record the current, voltage and watts input and the speed of the motor under test during the period of time that it is accelerating a given load. The chart representing speed and the time as ordinates as produced on the speed recording instrument 163 may be employed to give torque and speed. By the use of the above apparatus, the older prevailing methods of determining the motor characteristics are obviated, the improved arrangement eliminates the use of any brake or dynamometer, readings of starting torque, pull up torque, maximum torque, cut in speed, starting current, all of which are difficult to obtain with any degree of accuracy and tedious to record in production work.

It will, of course, be understood that the present detailed description of parts and the accompanying drawings relates to only a single preferred executional embodiment of the invention and that alterations may be made in the described construction and arrangement of parts without departing from the spirit and full intended scope of the invention.

I claim:

1. In a testing apparatus for electric motors, a test panel, a voltmeter, an ammeter and a wattmeter carried by said panel, current transformers of variable ratios adapted for arrangement in circuit with the ammeter and wattmeter, switching means for selectively interposing said transformers in circuit with said meters, a variable voltage source for energizing the test circuits and additional switching means for changing the voltage in the motor test circuit, independently of circuit relations between the said meters and transformers.

2. In a testing apparatus for electric motors and the like, a variable voltage generator, test equipment including an ammeter arranged to be brought into circuit with the generator and motor under test, transformers of differing ratio adapted selectively to be electically associated with said meters, relays for controlling the circuit relation of said transformers with respect to said meter and generator, a control circuit for said relays, and a switch for each relay, in said control circuit, each of said switches adapted upon movement in one direction to cause actuation of all of said relays.

3. In a testing apparatus for electric motors and the like, including a plurality of test circuits, relays for selectively associating the circuits with a motor under test, a control circuit for said relays, and a switch for each relay, in said control circuit, each of said switches adapted upon movement in one direction to cause actuation of all of said relays.

4. In a testing apparatus for electric motors and the like, including a plurality of test circuits, relays for selectively associating circuits with a motor under test, a control switch for each of said relays, a control circuit common to said relays, each of said switches having two fixed contacts in the common relay control circuit, a movable contact normally connecting the said fixed contacts to complete the relay control circuit, and an additional fixed contact, adapted for engagement by said movable contact, together with one of the first named fixed contacts, individually to actuate the associated relay.

5. In a testing apparatus for electric motors and the like, including a plurality of test circuits, multi-contactor relays for selectively associating circuits with a motor under test, a control switch for each relay, a control circuit common to said relays and switch, each of said switches having a plurality of fixed contacts, a movable contact normally bridging certain of said fixed contacts for completion of a circuit controlled by one of the relays, said contact adapted for movement into bridging relation with a different pair of said fixed contacts to actuate the associated relay.

6. In a testing apparatus for electric motors and the like, including a plurality of test circuits, a plurality of relays for selectively interconnecting a predetermined circuit with the motor under test, a control switch for each relay, a control circuit, each switch having a plurality of fixed contacts and a movable contact, means for normally maintaining a pair of said fixed contacts in bridging relation with said movable contact to establish a common relay control circuit, and manually-actuated means for disconnecting said common control circuit and for establishing said control circuit through another pair of contacts for individually actuating the associated relay.

7. In a testing apparatus for electric motors and the like including a plurality of test circuits, a plurality of relays for selectively associating the circuits with the motor under test, a control switch for each relay, a control circuit, each switch having a pair of fixed contacts and a movable contact for normally establishing control circuit relations between said relays, and manual control means for each switch for selectively actuating all of said relays to open position and for actuating one of said relays to closed position.

8. In an apparatus for testing electric motors and the like, a plurality of relays in circuit relation with the motor under test, switching means for each relay, a control circuit common to said switches, manual control means for momentarily interconnecting said control circuit and one of said relays, and a second manual control means for maintaining said relay in said control circuit.

9. In an apparatus for testing electric motors and the like, an alternator having variable winding connections, a voltmeter and a wattmeter, each having a variable scale, an ammeter, a plurality of relays, a plurality of switches controlling said relays for selectively connecting the several meters in circuit relation with said alternator and the motor under test, said switches being individually operable to relay-actuating position, and each switch being operable to cause an opposite actuation of a plurality of said relays.

10. In an apparatus for testing electric motors and the like, a conveyor for the motor under test, stationary testing equipment including meters for separately indicating the voltage, current, power and speed of a motor under test, companion movable and stationary contacts for keeping the motor under test in circuit with the meters while being conveyed, means for varying the voltage to the motor and meters, remote control switching means for said voltage- and current-varying means, and remote control switching means for controlling all of said meters.

11. In an apparatus for testing electric motors and the like, a stationary test assembly including a plurality of test circuits, means for continuously moving a motor under test adjacent said test assembly, and means for establishing predetermined circuit relations between said test circuits and the motor under test, said last named means including a plurality of momentary contact switches, and relays controlled by said switches for establishing said predetermined circuit relations.

12. In an apparatus for testing electric motors and the like, a stationary test assembly, means for progressively conveying the motor under test in adjacence to said test assembly, and means carried by said conveyor arranged to establish circuit relation between said test assembly and the motor under test, said test assembly including a plurality of test circuits, relays for selectively establishing a predetermined test circuit, and a momentary contact control switch for each of the relays.

13. In an apparatus for testing electric motors and the like, a test assembly including a plurality of test circuits, means for progressively conveying the motor under test adjacent said test assembly during the test operation, means for applying a load to the motor under test, and interlocking means between said load applying means and conveyor.

14. In combination with a conveyor for an electric motor, motor testing and metering equipment disposed near the path of the conveyor, and connections associated with the said equipment and conveyor, means for applying a load to the motor under test, and interlocking means between said load applying means and said conveyor, said testing and metering equipment being provided to indicate the mechanical output of the motor, while the motor is in transit on said conveyor.

15. In combination with a production conveyor for electric motors, motor testing equipment including a test panel disposed near the path of the conveyor, metering equipment associated with the test panel and conveyor, said metering and testing equipment including a plurality of test circuits, relays for selectively establishing predetermined test circuits, control switches for each relay and electrical connections associated with the metering equipment and disposed along the path of the conveyor, said connections and metering equipment coacting to provide indications of motor speed and torque, while the motor is in transit on said conveyor.

16. In a test assembly for electric motors of various speed and voltage ratings, a variable voltage source, a multi-scale voltmeter, switching means for concurrently varying the voltage source and selecting appropriate voltmeter connections, an ammeter, a plurality of current-transformer windings adapted to be selectively employed with the ammeter, and switches, independent of the first named switching means, for selectively associating said windings with the ammeter.

GORDON R. ANDERSON.